US 012379820B2

(12) United States Patent
Wilkinson et al.

(10) Patent No.: US 12,379,820 B2
(45) Date of Patent: Aug. 5, 2025

(54) ASSET MANAGEMENT SYSTEM

(71) Applicant: Woodside Energy Technologies Pty Ltd, Perth (AU)

(72) Inventors: Benjamin Wilkinson, Scarborough (AU); Brett Birkbeck, South Perth (AU); Ryan Luke Tripodi, Canning Vale (AU); Shaun Martin Gregory, Mount Pleasant (AU)

(73) Assignee: Woodside Energy Technologies Pty Ltd, Perth (AU)

( * ) Notice: Subject to any disclaimer, the term of this patent is extended or adjusted under 35 U.S.C. 154(b) by 0 days.

(21) Appl. No.: 17/837,074

(22) Filed: Jun. 10, 2022

(65) Prior Publication Data

US 2022/0308734 A1 Sep. 29, 2022

Related U.S. Application Data

(63) Continuation of application No. PCT/AU2020/050341, filed on Apr. 3, 2020.

(30) Foreign Application Priority Data

Dec. 10, 2019 (AU) .................. 2019904677

(51) Int. Cl.
*G06F 3/04815* (2022.01)
*G06F 3/0484* (2022.01)

(52) U.S. Cl.
CPC ........ *G06F 3/04815* (2013.01); *G06F 3/0484* (2013.01)

(58) Field of Classification Search
None
See application file for complete search history.

(56) References Cited

U.S. PATENT DOCUMENTS 8,874,242 B2 * 10/2014 Smith .................. G05B 13/047
700/17
9,516,052 B1 * 12/2016 Chauhan ............. H04L 63/1425
(Continued)

FOREIGN PATENT DOCUMENTS

EP 3318944 A2 5/2018
GB 2512999 A 10/2014
(Continued)

OTHER PUBLICATIONS

International Search Report in counterpart International Application No. PCT/AU2020/050341, mailed Apr. 29, 2020, 28 pages.
(Continued)

*Primary Examiner* — Haimei Jiang
(74) *Attorney, Agent, or Firm* — Edell, Shapiro & Finnan, LLC

(57) ABSTRACT

An asset management system that stores visual representation of an asset and its components, operational data of the components, and location of the components relative to the asset in a defined coordinate system. The system includes communication-enabled things disposed at the asset arranged to obtain component operational data and to communicate the operational data to data storage, and a user interface controllable by a user to display a visual representation of a selected portion of an asset, and to display visual representations of adjacent portions of the asset by receiving navigation instructions from the user. The user interface facilitates display of component information adjacent a component as the user navigates through the visual representation of the asset, the component information derived from the communication-enabled things. The stored data includes location of at least one actor disposed at the asset as the actor moves relative to the asset.

22 Claims, 7 Drawing Sheets

(56) References Cited

U.S. PATENT DOCUMENTS

| | | | | |
|---|---|---|---|---|
| 10,712,902 | B2* | 7/2020 | Andreae | G02B 27/017 |
| 10,956,014 | B2* | 3/2021 | Tappan | G06F 3/0482 |
| 11,015,433 | B2* | 5/2021 | Li | E21B 44/00 |
| 11,445,232 | B2* | 9/2022 | Browy | H04N 21/4126 |
| 11,510,027 | B2* | 11/2022 | Lundmark | H04W 4/80 |
| 2003/0023518 | A1* | 1/2003 | Spriggs | G06F 9/451 |
| | | | | 705/28 |
| 2006/0241793 | A1 | 10/2006 | Skourup et al. | |
| 2008/0247636 | A1 | 10/2008 | Davis et al. | |
| 2009/0089701 | A1* | 4/2009 | Baier | G06Q 10/06 |
| | | | | 715/772 |
| 2013/0055155 | A1* | 2/2013 | Wong | G06F 8/65 |
| | | | | 718/1 |
| 2013/0290908 | A1* | 10/2013 | Macura | G06T 19/003 |
| | | | | 715/850 |
| 2014/0075294 | A1 | 3/2014 | Hadley et al. | |
| 2014/0173742 | A1* | 6/2014 | Gluck | H04L 63/1433 |
| | | | | 726/25 |
| 2015/0169190 | A1* | 6/2015 | Girardeau | G06T 11/00 |
| | | | | 715/771 |
| 2015/0365635 | A1* | 12/2015 | Jose | H04N 7/185 |
| | | | | 348/14.07 |
| 2018/0131907 | A1* | 5/2018 | Schmirler | G05B 23/0216 |
| 2018/0158300 | A1* | 6/2018 | Laska | G06V 20/52 |
| 2018/0322699 | A1* | 11/2018 | Gray | G08G 5/55 |
| 2019/0073827 | A1* | 3/2019 | Coronado | G06T 19/006 |
| 2019/0087990 | A1* | 3/2019 | Hournbuckle, Jr. | |
| | | | | G06F 3/04842 |
| 2019/0138333 | A1 | 5/2019 | Deutsch et al. | |
| 2020/0168104 | A1* | 5/2020 | Holder | G08G 5/55 |
| 2020/0351537 | A1* | 11/2020 | Browy | G06T 19/003 |

FOREIGN PATENT DOCUMENTS

| | | | |
|---|---|---|---|
| JP | 2004108782 A | * | 4/2004 |
| JP | 2013196689 A | | 9/2013 |
| JP | 2014032672 A | | 2/2014 |
| JP | 2018010632 A | | 1/2018 |

OTHER PUBLICATIONS

International Search Report in counterpart International Application No. 2019904677, mailed Mar. 6, 2020, 20 pages.

International Written Opinion in counterpart International Application No. PCT/AU2020/050341, mailed Apr. 29, 2020, 5 pages.

International Written Opinion in counterpart International Application No. PCT/AU2020/050341, mailed Jan. 12, 2022, 7 pages.

International Preliminary Report on Patentability and Written Opinion in counterpart International Application No. PCT/AU2020/050341, mailed Mar. 25, 2022, 120 pages.

Supplementary European Search Report in counterpart European Application No. 20900041.3, dated Dec. 6, 2022, 10 pages.

Presentation by Shawn Fernando of Woodside Energy Technologies Pty Ltd in Shanghai, China at 19th International Conference & Exhibition on Liquefied Natural Gas entitled "Intelligent Assets—Integrating AI, Analytics, Sensors and Robotics To Improve LNG Business Value", Apr. 3, 2019, 9 pages.

Transcript of Speech by Chief Operating Officer of Woodside Energy Technologies Pty Ltd delivered to an American Chamber of Commerce event in Perth, Western Australia, Jul. 29, 2019, 8 pages.

Statement provided to Malaysian Registrar of Patents regarding disclosures made by Woodside Energy Technologies Pty Ltd, Jun. 10, 2022, 2 pages.

Office Action in counterpart Japan Application No. 2022-535709 with English translation, dated Jan. 22, 2024, 20 pages.

Examination Report in counterpart Australian Application No. 2020227025, dated Oct. 22, 2020, 7 pages.

Second Examination Report in counterpart Australian Application No. 2020227025, dated Oct. 20, 2021, 4 pages.

Examination Report in counterpart Saudi Arabian Application No. 522432949, dated Jul. 28, 2024, 19 pages.

* cited by examiner

ASSET MANAGEMENT SYSTEM

CROSS-REFERENCE TO RELATED APPLICATIONS

This application is a continuation of International Application No. PCT/AU2020/050341, filed Apr. 3, 2020, which claims priority from AU 2019904677, filed Dec. 10, 2019, the disclosures of which are incorporated herein by reference in their entireties.

FIELD

The present invention relates to an asset management system, and in particular to an asset management system for managing an asset in a resources industry.

BACKGROUND

An organisation may have a complex asset that for example is disposed at a remote location. For example, in the resources industry it is common for an asset to exist at a difficult to access remote location, such as offshore. Such assets are also typically complex and extensive in size, to the extent that the asset includes a large number of components that contribute to operation of the asset, and correct operation of the components is important to achieve successful operation of the asset.

Typically, an organisation carries out systematic analysis of operation of the asset including analysis of operation of asset components, and this is typically achieved by a management process that includes periodically deploying dedicated technicians to the asset to inspect specific components. However, transporting people to an asset is expensive, typically because the asset is at a location that is difficult to access.

SUMMARY

In the present specification, the term 'actor' means a person, system or device that is movable relative to the asset and is capable of interacting with an aspect of the asset management system. Example actors include a person, for example equipped with a mobile computing device, a robot, or any device or system capable of moving relative to the asset and interacting with the asset management system in any way.

In the present specification, the term 'robot' includes any autonomous or semi-autonomous device, system or vehicle, such as an unmanned aerial vehicle (UAV), a drone, an exoskeleton, an autonomous or semi-autonomous emergency response machine, an autonomous or semi-autonomous machine arranged to perform repetitive tasks, an autonomous or semi-autonomous roving vehicle arranged to autonomously move relative to the asset and carry out tasks as required, or a humanoid.

In the present specification, the term 'thing' means a network-enabled device or system that is arranged to obtain and/or generate data and communicate the data. Example 'things' include sensors, cameras, microphones and PLC devices.

In accordance with a first aspect of the present invention, there is provided an asset management system comprising:
a data storage arranged to store:
  visual data indicative of a visual representation of an asset, the visual representation including visual representations of components of the asset;
  component data indicative of characteristics of components of the asset including component operational data indicative of operation of the components, the component operational data being time stamped so as to include timing data; and
  spatial data including component location data indicative of location of the components relative to the asset in a first coordinate format according to a defined coordinate system;
a plurality of communication-enabled things disposed at the asset, each communication-enabled thing arranged to obtain component operational data indicative of operation of at least one component of the asset and to communicate the component operational data to the data storage;
a user interface arranged to facilitate access to the stored visual data, the user interface controllable by a user to display a visual representation of a selected portion of an asset that includes visual representations of components of the asset, and to facilitate virtual navigation by a user through the asset by displaying visual representations of adjacent portions of the asset in response to receipt of navigation instructions from the user;
wherein the user interface is arranged to facilitate display of component operational data adjacent a component as the user navigates through the visual representations of portions of the asset, the component operational data derived from at least one communication-enabled thing associated with the component;
wherein the user interface comprises a user manipulatable timeline associated with the displayed selected portion of the asset, the timeline usable by a user to select a time and in response the user interface using the time stamps associated with the component operational data to facilitate display of component operational data associated with the selected time for all components shown on the selected portion of the asset.

In an embodiment, the user interface is arranged to automatically display component information adjacent a component as the user navigates through the visual representation of the asset when the visual representation of the component is displayed by the user interface.

In an embodiment, the system is arranged to facilitate display of component information adjacent a component as the user navigates through the visual representation and to display further component information in response to user input.

In an embodiment, the user interface is arranged to display component information adjacent a component in response to user input when the visual representation of the component is displayed by the user interface.

In an embodiment, at least some of the component information displayed adjacent a component is based on user defined criteria.

In an embodiment, the component data includes data indicative of the type of component.

In an embodiment, the displayed component information includes maintenance information.

In an embodiment, the visual representation of the asset includes a visual representation of an actor at a location corresponding to the location of the actor at the asset.

In an embodiment, the component location data includes timing data indicative of the time at which a component is disposed at a location.

In an embodiment, the actor location data includes timing data indicative of the time at which an actor is disposed at a location.

In an embodiment, the actor comprises a geolocation device arranged to produce the actor location data indicative of the location of the actor relative to the asset.

In an embodiment, the actor comprises a mobile computing device, the mobile computing device including the geolocation device.

In an embodiment, the system comprises a plurality of machine-readable markers disposed at distributed locations at the asset, wherein the actor includes a location device arranged to determine the location of the location device relative to the machine-readable markers and thereby the location of the actor relative to the asset. The machine-readable markers may include visual location markers or Bluetooth beacons.

In an embodiment, the geolocation device is arranged to determine the location of the actor relative to the asset using simultaneous localisation and mapping (SLAM) techniques.

In an embodiment, the component data includes:
data indicative of audio;
data indicative of video;
data indicative of at least one image;
data indicative of vibration;
data indicative of temperature;
data indicative of electrical current;
data indicative of flow rate;
data indicative of pressure;
data indicative of speed of movement;
data indicative of control values;
data indicative of equipment performance;
data indicative of position or state of a part of a component; and/or
data indicative of operational status (ON/OFF) of a component.

In an embodiment, the plurality of communication-enabled things includes any one or more of:
a microphone;
a sensor;
a programmable logic controller (PLC) device.

In an embodiment, the plurality of communication-enabled things includes a still and/or video camera. The spatial data may include data indicative of the location shown in the field of view of the camera.

In an embodiment, the user interface is arranged to automatically play audio associated with a portion of the asset as the user navigates through the visual representation of the asset and the portion of the asset is displayed, the audio derived from at least one microphone.

Each thing may be incorporated into a component, connected to a component or disposed adjacent the component.

In an embodiment, the visual data indicative of a visual representation of an asset comprises image data indicative of images of the asset, virtual representations indicative of the asset, and/or point cloud data indicative of the asset. The virtual representations may be CAD representations.

In an embodiment, the user interface uses a second coordinate format different to the first coordinate format, and the system is arranged to convert location data between the first and second coordinate formats. The first coordinate format may conform to WGS 84 global reference system data.

In an embodiment, the data storage is disposed at a cloud server.

In an embodiment, the system comprises a LoRaWAN and/or WiFi network at the asset and the operational data obtained from the communication-enabled things is communicated to the data storage using the LoRaWAN and/or the WiFi network.

In an embodiment, the system comprises an edge server disposed between a wide area network and the communication-enabled things, the edge server arranged to process data obtained from the communication-enabled things and to communicate processed data to the data storage through the wide area network.

In an embodiment, the system comprises at least one application programming interface (API) arranged to facilitate access to the system and/or the visual data and/or the component data from a remote location.

In an embodiment, the system comprises an analysis engine arranged to automatically analyse the component data and carry out an action in response to the analysis. The analysis engine may carry out the analysis using machine learning (ML) and/or artificial intelligence (AI) techniques.

In an embodiment, the analysis engine is arranged to instigate a maintenance action in response to the analysis.

In an embodiment, the analysis engine is arranged to analyse performance of at least one component and to instigate an action when behaviour of the component is determined to deviate from defined normal behaviour.

In an embodiment, the analysis engine is arranged to predict a future reduction in performance of at least one component based on current or historical component data.

In an embodiment, the system comprises a rules engine arranged to facilitate creation and execution of customised rules to carry out defined actions in response to defined conditions directly or indirectly dependent on the component data.

In an embodiment, the system is arranged to carry out an action in response to location of an actor at the asset.

In an embodiment, the system is arranged to communicate information to the actor in response to location of the actor at the asset.

In an embodiment, the system is arranged to communicate operational data to the actor in response location of the actor at the asset.

In an embodiment, the system is arranged to update operational data associated with a thing in response to location of the actor at the asset.

In an embodiment, the system is arranged to communicate warning information to the actor in response location of the actor at the asset.

In an embodiment, the system is arranged to carry out an action based on proximity of the actor to a defined component of the asset.

In an embodiment, the system is arranged to allocate a task to the actor based on the location of the actor at the asset.

In an embodiment, the actor includes a robot.

In an embodiment, the system is arranged to cause the robot to carry out a defined action in response to defined criteria. The at least one defined action may be instigated by a machine learning (ML) or artificial intelligence (AI) algorithm, an outcome of a defined rule, and/or in response to an instruction from a user.

In an embodiment, the system is arranged to control the robot to capture visual data indicative of at least one defined portion of the asset.

In an embodiment, the system is arranged to control the robot to carry out at least one maintenance action.

In an embodiment, the actor comprises a person equipped with a mobile computing device and the system is arranged to communicate a defined action for the person to the mobile computing device in response to defined criteria.

In an embodiment, the system includes a things manager usable to register a communication-enabled thing with the system.

In an embodiment, a communication-enabled thing includes a unique machine-readable identifier and the system facilitates capture of the machine-readable identifier in order to identify and register the communication-enabled thing with the system. The machine-readable identifier may be a QR code and may be captured using a portable computing device.

In an embodiment, the things manager is arranged to facilitate reception of information indicative of:
the location of the thing at the asset;
the purpose of the thing;
how the thing is mounted;
an image of the thing when deployed;
the component that the thing is associated with;
the purpose of one or more sensors of the thing;
the part of the component associated with each sensor of the thing;
and/or
configuration information associated with the thing.

In an embodiment, the system comprises a workflow engine arranged to facilitate creation and/or execution of tasks and workflows to be carried out by a user.

The workflow engine may be arranged to define and implement a virtual start of shift sequence of observations wherein an operator is automatically directed to sequentially inspect a visual representation and component data of a defined set of components and thereby virtually inspect the corresponding actual components of the asset.

In an embodiment, the system comprises at least one user application arranged to facilitate access to the visual representations of the asset and the component data derived from the asset, to facilitate virtual operations in relation to the visual representations of the asset and the component data derived from the asset, to facilitate collaboration between users, and/or to facilitate management of tasks and asset personnel.

In an embodiment, the at least one user application is accessible through a web browser.

In an embodiment, the user applications include a process awareness application usable to enable an operator to view a representation of a production process associated with the asset.

In an embodiment, the process awareness application is arranged to display a pseudo-3D representation of the production process.

In an embodiment, the representation of the production process is shareable virtually so that multiple users may collaborate to view, design, modify and/or troubleshoot the process.

In an embodiment, the process awareness application is arranged to facilitate addition of at least one data point to the representation of the production process, each data point associated with selected operational data.

In an embodiment, the system is arranged to facilitate addition of at least one data point to the visual representation, each data point associated with user selected operational data.

In an embodiment, the user applications include a chat application that enables an operator to interact with other operators of the system. The chat application may facilitate linking of a chat to a specific location of the asset or a specific asset component.

In an embodiment, the user applications also include a voice application that provides an operator with the ability to interact with the system using voice commands and voice responses.

In an embodiment, the asset is a resources industry asset.

In accordance with a second aspect of the present invention, there is provided a method of managing an asset, the method comprising:
storing visual data indicative of a visual representation of an asset at a data storage, the visual representation including visual representations of components of the asset;
storing component data indicative of characteristics of components of the asset including component operational data indicative of operation of the components at the data storage, the component operational data being time stamped so as to include timing data;
storing spatial data including component location data indicative of location of the components relative to the asset in a first coordinate format according to a defined coordinate system;
disposing a plurality of communication-enabled things at the asset, each communication-enabled thing arranged to obtain component operational data indicative of operation of at least one component of the asset and to communicate the component operational data to the data storage;
facilitating access to the stored visual data using a user interface, the user interface controllable by a user to display a visual representation of a selected portion of an asset that includes visual representations of components of the asset, and to facilitate virtual navigation by a user through the asset by displaying visual representations of adjacent portions of the asset in response to receipt of navigation instructions from the user; and
facilitating display on the user interface of component operational data adjacent a component as the user navigates through the visual representations of portions of the asset, the component operational data derived from at least one communication-enabled thing associated with the component;
wherein the user interface comprises a user manipulatable timeline associated with the displayed selected portion of the asset, the timeline usable by a user to select a time and in response the user interface using the time stamps associated with the component operational data to facilitate display of component operational data associated with the selected time for all components shown on the selected portion of the asset.

BRIEF DESCRIPTION OF THE DRAWINGS

The present invention will now be described, by way of example only, with reference to the accompanying drawings, in which.

DETAILED DESCRIPTION

Figure 1:
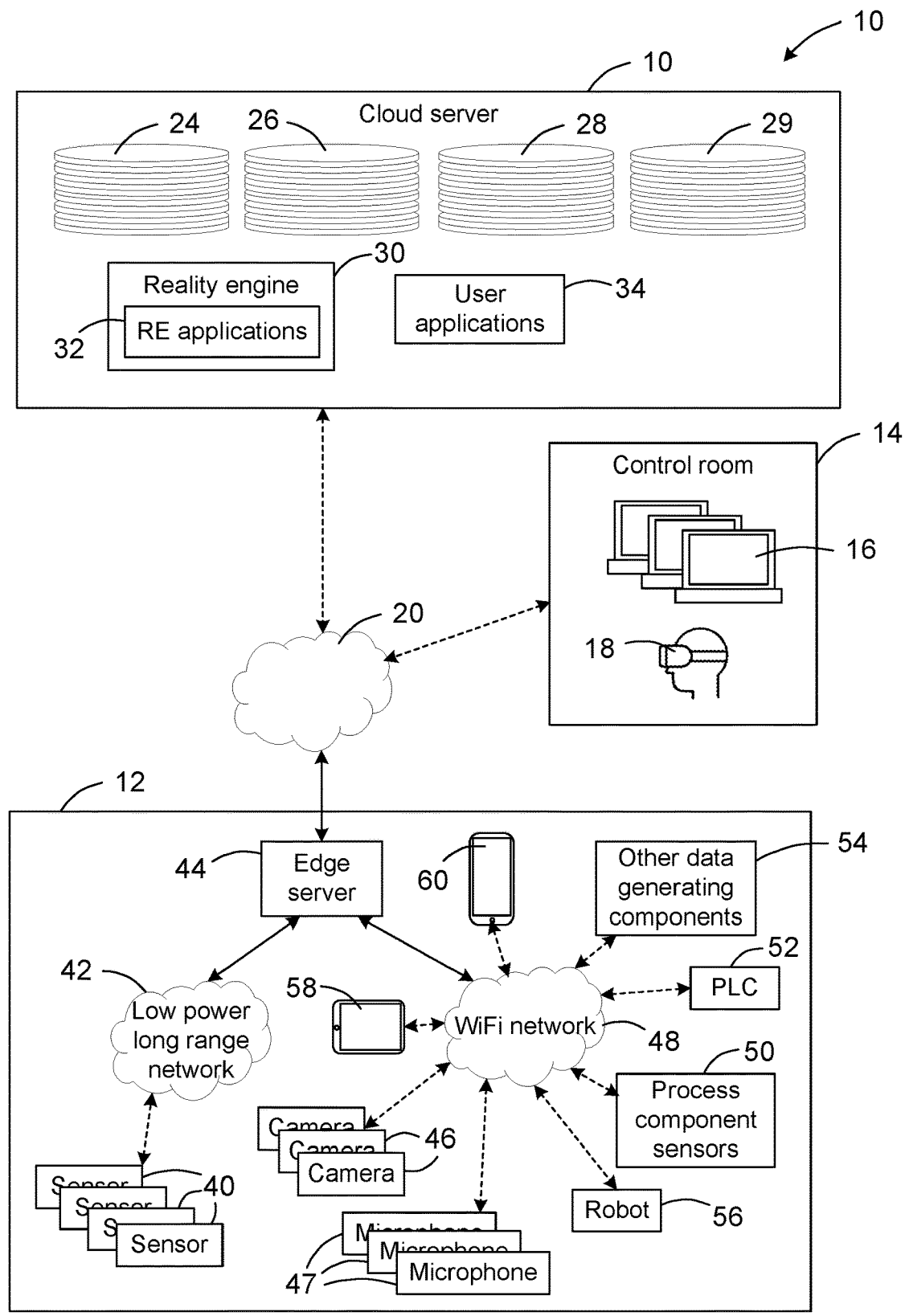
FIG. 1 is a schematic block diagram of an asset management system in accordance with an embodiment of the present invention.

Referring to FIG. 1 of the drawings, there is shown an asset management system 10 for managing an asset, such as an offshore platform in the resources industry.

In this example, the system 10 is arranged to store a virtual representation of an asset that includes a visual representation of the asset and a digital twin of each operative component of the asset. A digital twin of a component is a digital replica of the actual component that includes accessible data associated with characteristics of the component, including operative data associated with the component. For example, a digital twin of a pump component would include information indicative of the type of pump and operative data associated with the pump such as the vibration characteristics of the pump, the temperature of the pump, the current speed of rotation of a rotatable component of the pump, an image of the pump, audio of the pump, and so on.

The system collates the digital twin data associated with the asset components, and facilitates access to the visual representation and the digital twin data. In this way, since the digital twin data is representative of the actual components of the asset, and importantly the actual functionality of the components, it is possible to appropriately manage, observe, and analyse operation of the asset components and the asset as a whole from a remote location without the need for a person to be physically present at the asset. In other words, a user interacting with the asset in the cyber world through a user interface of the asset management system is provided with an experience and the ability to interact with the asset in a way that is similar to a user interaction with the asset in the physical (real) world.

The system is also arranged to geospatially locate the digital twin data with the visual representation of the asset, and for this purpose the system is arranged to store spatial data indicative of the locations of components of the asset. The system is also arranged to store spatial data indicative of the locations of movable actors disposed at the asset so that the locations of the actors can be made visible on the visual representation and actions can be carried out in relation to the actors based on the locations of the actors relative to the asset.

Importantly, the component location data and the actor location data are stored in the same coordinate format, so that an actor, such as a person disposed at the asset and provided with a movable computing device, is able to interact with the asset in the cyber world based on the location of the person, for example in order to obtain operational data associated with a component based on proximity of the person to the component in the physical (real) world at the asset, or so that the asset management system can interact with an actor, such as a person disposed at the asset, through the mobile computing device to provide the person with relevant information based on the location of the person relative to the asset.

The spatial data may be stored in any suitable format, and in this example the spatial data conforms to WGS 84 global reference system data used by the Global Positioning System (GPS). All spatial data, including all asset-related and actor-related location data is therefore either receivable in WGS 84 format, or converted to WGS 84 format by the system so that location data associated with the components in the visual representation of the asset and location data associated with actors physically disposed at the asset are stored in the same coordinate system. However, it will be understood that any suitable common coordinate system may be used for the asset-related and actor-related location data.

The components of the asset that have associated stored spatial data may include any relevant asset component, in particular functional asset components, such as for example pumps, valves, pipes and so on in an oil and gas resources industry asset.

In order to create a visual representation of the asset, visual representations of all relevant portions of the assets must be obtained. The visual representations in this example include virtual representations of the asset, for example CAD-type representations of the asset, and point cloud representations of the asset, although it will be understood that the visual representations may also include images of the asset captured using a camera.

In this example, the point cloud data is captured using a Leica BLK 360 Scanner and an associated application implemented on a connected computing device, such as a tablet computing device, although it will be understood that any suitable camera is envisaged.

In this example, the point cloud data is geospatially aligned with the virtual representation of the asset, for example by identifying a plurality of target features of the virtual representations and linking these with corresponding identified features in the point cloud data.

Referring to FIG. 1, the asset management system 10 is arranged to manage an asset that is disposed at an asset location 12. For clarity, only components of the asset management system 10, and not components of the asset itself, are shown. In this example, the asset is managed from a common remote location 14 that typically includes several computing devices 16 that may be personal computers, and may include virtual reality equipment 18 usable by an operator to view the virtual representation of the asset as a pseudo 3-dimensional representation of the asset. In this example, the common remote location 14 is referred to as a control room.

In this example, the control room 14 communicates with the components of the asset management system 10 at the asset location 12 through the Internet 20, although it will be understood that any suitable wide area network is envisaged.

The asset management system 10 also includes a data storage facility, in this example implemented at a cloud server 22, the cloud server 22 storing asset representation data 24 indicative of visual representations of all relevant portions of the asset, including for example virtual (such as CAD-type) representations and/or images of the asset portions, and point cloud data 26 indicative of the asset portions; component data 28 including digital twin data indicative of characteristics of the relevant components of the asset, including component operative data derived from the component, such as data from component sensors, images of the component captured during operation, and audio of the component captured during operation; and spatial data 29 indicative of locations of each relevant component of the asset, locations of network-enabled things, and locations of any actors associated with and disposed at the asset.

The component data 28 is time stamped so that the component data 28 can be analysed and used in a time-relevant way, for example so that the behaviour of a component at a specific time can be extracted and analysed by an operator. Similarly, the spatial data 29 is time stamped so that the spatial data 29 can be analysed and used in a time-relevant way, for example so that the movement of an actor in a specific time period can be extracted and analysed by an operator.

In this example, the cloud server 22 is hosted by Amazon Web Services, although it will be understood that other implementations are possible. For example, the cloud server may be hosted in other environments, such as Microsoft Azure.

In an alternative arrangement, instead of hosting all data at one data storage facility, the asset representation data 24 and the component data 28 may be hosted by multiple data storage facilities that are arranged to operate together so that a user experiences a single integrated capability. For example, data may be separately stored so that a third party may manage and monitor their equipment, but the third party does not have access to other asset-related data. In an LNG example, a component of an asset such as a gas turbine may be fully managed by the gas turbine vendor using their own cloud-based data storage facility, whilst enabling a digital twin to be created for the component that can be used by authorised users of the system 10.

In this example, the cloud server 22 also includes a reality engine 30 that manages the data stored at the cloud server 22, facilitates coordinated access to the stored data, and implements dedicated and ad-hoc operations on the stored data, for example in order to systematically monitor, observe and/or analyse operation of components of the asset and/or the asset as a whole, or carry out such operations in response to ad-hoc user requests. In this example, the reality engine 30 implements desired functionality using a plurality of reality engine applications 32 described below.

In this example, the cloud server 22 also includes user applications 34 that are used to facilitate controlled interaction with the asset representation data 24, the point cloud data 26 and the component data 28 in order to carry out specific management tasks described in more detail below.

In this example, the network communication enabled things include sensors 40, 50, cameras 46, microphones 47, PLC devices 52, and other data generating components 54.

As shown in FIG. 1, the asset location 12 includes sensors 40 that are each separate to an asset component and dedicated to sensing at least one characteristic of the component of the asset, such as vibration and/or temperature of a pump. Each sensor 40 may be connected to a component or disposed adjacent the component 40, depending on the characteristic desired to be sensed. Each of the sensors 40 produces data indicative of the sensed characteristic, and in this example the sensed data is communicated to the cloud server 22 for storage as component data 28 using a dedicated local low power long range wireless network 42 that in this example is based on a LoRaWAN protocol. Such a network is used for the sensors 40 because a large number of sensors 40 are typically used and creating a sufficiently extensive 802.11xx based network for the sensors 40 would be expensive and impractical. A LoRaWAN-type network is also used because relatively low power is required to be used by the sensors 40 to communicate with the network. An example sensor 40 for sensing temperature and vibration and communicating the sensed data to the cloud server 22 is described in International patent application No. PCT/AU2019/051078, the contents of which are hereby incorporated by reference.

In this example, the asset location 12 also includes an edge server 44 disposed between the sensors 40 and the Internet 20, the edge server 44 serving to implement functionality at a location close to the asset for processing and data management efficiency reasons. For example, the edge server 44 may be arranged to carry out initial processing on the data received from the sensors 40 which reduces the amount of data required to be sent to the cloud server 22.

In this example, the asset location 12 also includes a plurality of cameras 46 disposed at defined locations at the asset location to capture images and/or video of defined portions or components of the asset. For example, a camera 46 may be disposed at the asset so as to capture images and/or video of a pump that may subsequently be used by an operator to determine whether the pump is operating correctly.

The asset location 12 also includes a plurality of microphones 47 disposed at defined locations at the asset location to capture audio. For example, a microphone 47 may be disposed so as to capture audio of a pump that may subsequently be used by an operator to determine whether the pump is operating correctly.

In this example, the asset location 12 also includes a WiFi network 48 based on an 802.11xx protocol, the WiFi network 48 used to communicate data from the cameras 46 and the microphones 47 to the cloud server 22 for storage as component data 28.

In this example, the asset location 12 also includes integrated process component sensors 50 that, unlike the sensors 40, are integral with components of the asset. Each process component sensor 50 is dedicated to sensing at least one characteristic of a component, and each of the process component sensors 40 produces data indicative of the sensed characteristic that is communicated through the WiFi network 48 to the cloud server 22 for storage as component data 28. For example, the process component sensors 50 may include a sensor incorporated into a fluid tank to sense the level of fluid in the tank, or a sensor incorporated into a valve to sense whether the valve is open or closed.

The asset location 12 may also include one or more programmable logic controller (PLC) devices 52 that are present at the asset to manage control of specific aspects of the asset. Each PLC device 52 may produce data indicative of the controlled aspect of the asset for communication through the WiFi network 48 to the cloud server 22 for storage as component data 28.

However, it will be understood that the asset location 12 may include any other data generating component 54 that produces data indicative of operation of the asset or more particularly one or more components of the asset. Such other data is also communicated through the WiFi network 48 to the cloud server 22 for storage as component data 28.

As described above, the spatial data 29 stored at the cloud server 22 includes location data indicative of the location of each thing relative to the asset. For a camera 46, the spatial data may also include location data indicative of the field of view of the camera 46, for example by including location data corresponding to the location at the asset that is shown in the field of view of the camera 46.

It will be understood that the 'things'—the sensors 40, cameras 46, microphones 47, process component sensors 50, PLC devices 52 and/or other data generating components 54—produce data associated with operation of the asset, and in particular, data indicative of operation of each component of the asset, and the combined data enables a digital twin of each component to be produced. Using the digital twin information associated with a component, an operator is able to gain situational awareness of the component that is sufficient for the operator to determine the state of the component, performance of the component and whether any current or potential future issues exist. In addition, since the captured component data 28 stored at the cloud server 22 is time stamped, it is possible for the operator to view and analyse historical component data, view trends in component performance over a defined time period and so on.

In this example, the asset location 12 also includes at least one robot 56 configured to carry out defined actions in response to instructions from the reality engine 30, for example based on pre-defined schedules or ad-hoc actions instigated by an operator, actions in response to events or triggers occurring in the system, or actions in response to an actor disposed at the asset. For example, a robot 56 may be tasked with periodically travelling along a defined route through the asset and capturing point could data or image data of the asset so that the point cloud data 26 and asset representation data 24 (if images of the asset are captured) are substantially current. In a further example, the robot 56 may be tasked with carrying out maintenance actions on an asset component, for example in response to analysis of the component data 28 and in particular the digital twin information of the component in the component data 28.

As shown in FIG. 1, the WiFi Network 48 is also in communication with the edge server 44 and therefore the edge server 44 may also be used to carry out initial processing on the data received from the sensors 40, cameras 46, microphones 47, process component sensors 50, PLC devices 52 and/or other data generating components 54, for example to reduce the amount of data required to be sent to the cloud server 22 and/or reduce the processing burden at the cloud server 22. For example, the edge server 44 may be arranged to only send data associated with the cameras 46 and/or the microphones 47 at periodic intervals and/or if an event of significance is detected, such as an anomalous sound that may indicate a faulty component.

In this example, the system 10 is also arranged so that an actor, such as a person, is able to interact with the system 10 when the person is present at the asset location 12. For example, a person may interact with the system 10 using a portable computing device such as a tablet computer 58 or a smartphone 60. Using such a device, the person may for example control capture of asset image data and/or point cloud data using a suitable camera such as a Leica BLK 360 Scanner. In addition, the person may access asset representation data 24, point cloud data 26 and/or component data 28 and may be provided with similar functionality as is provided at the control room 14. In addition, the portable computing device 58, 60 may be used to communicate relevant information to the person as the person moves through the asset. For example, based on an identified location of the portable computing device 58, 60 relative to the asset, a warning message may be communicated to the user if the user has entered a potentially unsafe location.

Figure 2:
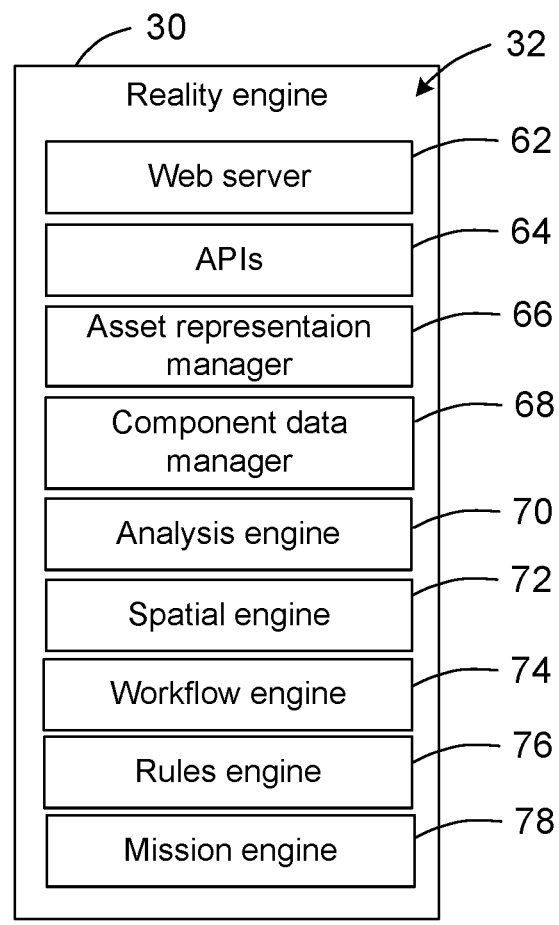
FIG. 2 is a diagrammatic representation of components of a reality engine of the system shown in FIG. 1.

Referring to FIG. 2, example reality engine applications 32 are shown. In this example, the reality engine applications 32 include a web server 62 arranged to provide an Internet accessible user interface that enables a user to access functionality provided by the cloud server 22 through a web browser. However, it will be understood that any suitable arrangement for facilitating access to the asset representation data 24, point cloud data 26, component data 28 and the reality engine applications 32 is envisaged.

The reality engine applications 32 also include suitable APIs 64 that enable software executed on remote computing devices to directly access the stored asset representation data 24, point cloud data 26 and component data 28, and/or the functionality of the reality engine applications 32.

The reality engine applications 32 also include an asset representation manager 66 usable to manage importation of asset representations, storage of the asset representations as asset representation data 24 and point cloud data 26 at the cloud server 22, and to manage interactions with the asset representation data 24 and point cloud data 26. The asset representations may be of any suitable form, including images captured by a suitable camera, virtual representations including CAD-type representations, and point clouds, and the asset representation manager 66 may be arranged to facilitate importation of the asset representations, stitching together of the representations into a virtual representation of the whole asset, and storage of the asset representations in an appropriate structure that facilitates ease of navigation by a person viewing the representations.

In this example, the virtual representation of the asset is in CAD-type format and the CAD representation uses a native cartesian coordinate system with a selected defined origin for all virtual components represented by the virtual representation. During use, the CAD coordinates are derived from the spatial data 29 by dynamically converting from the stored WGS 84 format.

During initialisation of the virtual representation, the locations of components and things in native CAD format are converted to WGS 84 format by the system for storage as spatial data 29.

In an example, the asset representation manager 66 also interfaces with a robot 56 at the asset location 12, and may use the robot 56 to systematically capture point cloud and/or image data at defined periodic intervals so that the stored asset representation data 24 and point cloud data 26 is maintained substantially current. Point cloud and/or image data captured by the robot 56 may be communicated to the cloud server 22 through the WiFi network 48 at the asset location 12 and the Internet 20.

The asset representation manager 66 is also used to control and manage extraction of data from the stored asset representation data 24 and point cloud data 26 according to instructions received from a user, other system, or external applications, as required to display desired representations of the asset. In this example, the asset representation manager 66 also displays the locations of the actors on the displayed representations. In order to produce the asset representations, the locations of asset components, things and actors are sourced from the stored spatial data 29 and converted from the common WGS 84 format to the cartesian coordinate format used by the asset representation manager 66.

The reality engine applications 32 also include a component data manager 68 usable to manage importation of: component data 28 including digital twin data from the sensors 40, cameras 46, microphones 47, process component sensors 50, PLC devices 52 and/or other data generating components 54; and timing data associated with the digital twin data and actors.

The component data manager 68 is also used to control and manage extraction of data from the stored component data 28 according to instructions received from a user, other system or external application, as required to perform a desired task such as a data analysis task, component fault analysis task, and so on.

The reality engine applications 32 also include an analysis engine 70 arranged to automatically analyse the component data 28, for example using machine learning (ML) and/or artificial intelligence (AI) techniques. For example, in accordance with a defined ML or AI algorithm, the analysis engine 70 may be arranged to automatically learn normal ranges of behaviours for components of the asset and take appropriate action when component behaviour is determined to deviate from normal, to perform predictive analysis of digital twin data, and/or to analyse performance and reliability of a particular type of component based on the collective knowledge of all similar components, and for example maintenance history. Such action may include creation of an automated task or workflow, issuing of a notification to an operator, and/or instigation of a maintenance action. In a particular example, the analysis engine 70 may automatically analyse captured audio and determine that a particular pump may have or be shortly about to fail based on a comparison of the captured audio for the pump with previously captured audio for a different pump that failed. In response to the automatic determination in relation to the failing pump, the analysis engine 70 may be arranged to instigate a maintenance action.

The reality engine applications 32 also include a spatial engine 72 arranged to manage receipt and storage of spatial data 29 including receipt and storage of component location data indicative of the locations of components of the asset; and actor location data indicative of the locations of actors disposed at the asset as the actors move relative to the asset. The spatial engine 72 is also arranged to facilitate analysis of the component data 28 based on location, for example so as to identify the location of one or more components or component types, to locate components in the asset representations based on engineering drawings or models, to infer location of items based on known component locations, and/or to locate an item in response to presence of the item in a camera field of view. In a particular example, the spatial engine 72 may be used to identify and locate all relevant data sources in the proximity of an identified incident with an asset component, such as a camera that has a field of view of the incident or a microphone that may have relevant audio of the incident.

The spatial data 29 managed by the spatial engine 72 may be used by the system to instigate actions by actors at the asset, for example so as to carry out an action at a particular location by an actor when the actor is determined to be close to the location. This may be implemented by sending a task to a suitable actor determined to be the closest to the desired location, or by saving a task linked to a particular location, and communicating the task to a suitable actor when the actor moves to a location sufficiently close to the location of saved task. In a specific example, a task may be to obtain a thermal image of a component, and a suitable robot with thermal imaging capability tasked when the robot is determined to be close to the component.

The actor location data provided to the spatial engine 72 for storage may be obtained in WGS 84 format directly from the actor, for example from a mobile computing device associated with the actor, such as a smartphone or tablet computer associated with a person, or directly from a geolocation device associated with a robot.

However, it will be understood that the actor location data may be obtained in any suitable way. For example, the location of an actor may be determined using visual location markers or beacons, such as Bluetooth beacons, disposed at the asset, or using simultaneous localisation and mapping (SLAM) techniques.

It will be understood that since the common spatial data format used in the present example is WGS 84 format, if the actor location data received by the spatial engine 72 is not in WGS 84 format, the actor location data is converted by the spatial engine 72 to WGS 84 format for storage at the cloud server 22.

The reality engine applications 32 also include a workflow engine 74 arranged to manage tasks and workflows to be carried out by an operator, for example located at the control room 14, or tasks/workflows to be carried out by the robot 56. For example, the workflow engine 74 may be used to define a virtual start of shift sequence of observations to be carried out by an operator at the control room, wherein the operator is automatically directed to sequentially inspect the digital twin of a defined set of components and thereby virtually inspect the corresponding actual components at the asset location 12. The workflow engine 74 may also be arranged to monitor user responses to automated recommendations made to a user so as to improve the learning of the ML and/or AI models.

The reality engine applications 32 may also be arranged to facilitate creation, importation, management and execution of standard operating procedures in relation to components or aspects of the asset, for example using the workflow engine. The standard operating procedures are associated with the digital twin data and are spatially linked to the digital twin data so that for example information associated with the standard operating procedures is automatically provided to an actor based on the location of the actor at the asset. For example, a tank may have a standard operating procedure relating to a process to be followed for changing the tank from holding mode to loading mode, and the required procedure to do this communicated to an actor by displaying the information to the actor on a mobile computing device 58, 60 when the actor is tasked to carry of the procedure and the actor is located next to the tank. Multiple users and/or actors may participate in implementation of the standard operating procedure, for example such that an operator at the control room 14 and an operator at the asset are able to work together to carry out the process.

The reality engine applications 32 also include a rules engine 76 arranged to enable user creation of rules to carry out defined actions, for example based on determined events, analysis of the digital twin data, outputs from the analysis engine 70, or user actions. The rules may be configured as programmable logic, decision trees, machine learning models or artificial intelligence, and may be incorporated into workflows as decision points to enable conditional processing to occur based on outcomes of the rules.

The reality engine applications 32 also include a mission engine 78 arranged to manage communications with actors, for example through computing devices associated with the actors, or directly with autonomous equipment, such as the robot 56, including transferring mission, planning and control instructions to the autonomous equipment, and tracking responses and performance in real time. The mission engine 78 also interfaces with other reality engine applications 32, for example so that appropriate actions can be carried out in response to actor operations.

The user applications 34 are accessible by a user and may implement functionality using the reality engine applications 32.

A user of the organisation is able to access the asset representation data 24, the point cloud data 26, the digital twin information associated with the component data 28 and/or the spatial data 29 using any suitable computing device, including a laptop or personal computer 16, a smartphone 60, a tablet computer 58 or a virtual reality content delivery device, for example that includes VR equipment 18 that includes a headset.

In this example, each computing device accesses the asset representation data 24, the point cloud data 26, the component data 28 and/or the spatial data 29 through the Internet 20 using a suitable web browser.

During use, when a user desires to access the asset representation data 24, the point cloud data 26 and/or the component data 28 stored at the cloud server 22, the user directs the web browser on the relevant computing device 54, 56, 58 to a website address associated with the cloud server 22. The access request is analysed by the system 10 to determine whether the requesting user has appropriate login credentials and, if so, a connection is established between the user computing device and the cloud server 22.

Screens displayed to an authorised user in the web browser when the authorised user is granted access to the cloud server 22 are used to interact with the system 10, and in particular to access the visual representations and the digital twin information associated with the component data 28.

Figure 3:
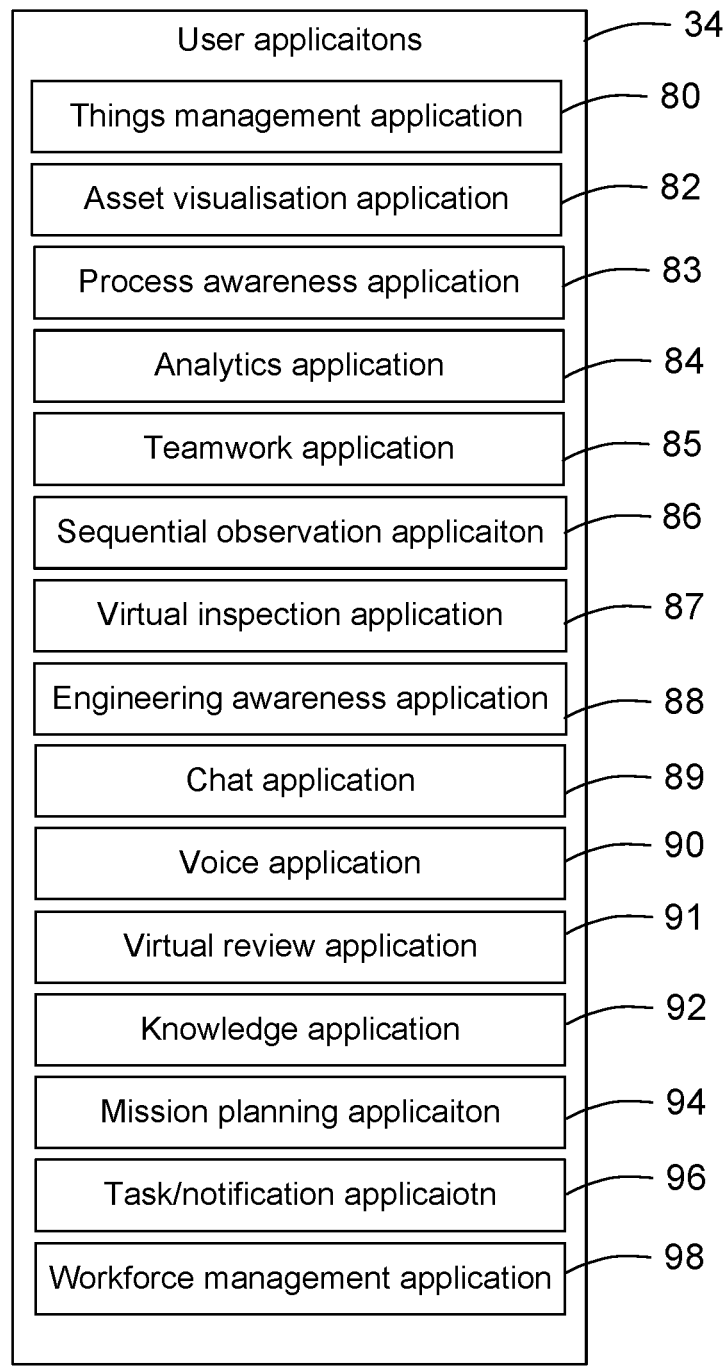
FIG. 3 is a diagrammatic representation of user applications of the system shown in FIG. 1.

Referring to FIG. 3, example user applications 34 accessible through the web server 62 are shown.

In this example, the user applications 34 include a things management application 80 usable to add 'things' to the system 10 and subsequently manage the 'things', in the present example sensors 40, cameras 46, microphones 47, process component sensors 50, PLC devices 52 and/or other data generating components 54. After a 'thing' has been added, data associated with the thing is stored at the cloud server 22 as digital twin data for the component with which the 'thing' is associated. The things management application 80 facilitates addition of a new 'thing', such as a new sensor, and this may be achieved using a portable computing device, such as a tablet computer 58 or smartphone 60, for example using an application on the portable computing device.

In an example, each sensor 40 to be added includes a machine readable code that identifies the sensor, such as a QR code, and a tablet computer application is used to scan the code to thereby associate the sensor 40 with the system 10. The things management application 80 is also used to specify the location of the sensor 40, for example by specifying the location of the sensor on a visual representation of the asset to thereby provide a coordinate for the sensor in a cartesian format used by the asset representation manager 66; to specify the purpose of the sensor 40, such as that the sensor is arranged to sense vibration and temperature, for example by entering a predefined function code recognised by the system; to specify how the sensor is mounted; to capture an image of the sensor when deployed; and to specify the component that the sensor 40 is associated with. The things management application 80 is also used to configure the sensor 40, for example how often data is sent from the sensor 40 to the cloud server 22, and the type or data format used. In a variation, instead of specifying the location of the added thing, the machine-readable code may also be associated with stored information specifying the intended location for the thing associated with the code, such that reading the code using a suitable machine provides both identifying information and location information for the thing.

The things manager application 80 is also used to add and manage other 'things' including cameras 46, microphones 47, process component sensors 50, PLC devices 52 and/or other data generating components 54. It will be understood that each 'thing' would typically include a different set of configuration parameters. For example, configuration of a camera 'thing' may include configuration of the field of view of the camera and specifying the location that is visible in the field of view of the camera.

The user applications 34 also include applications that facilitate access to the visual representations of the asset and the digital twin information, applications that facilitate structured virtual operations in relation to the digital twin information, applications that facilitate collaboration between operators in the context of the asset and digital twin information, and applications usable to manage tasks and asset personnel.

In this example, the user applications 34 include an asset visualisation application 82 usable to enable an operator to view a representation of a selected portion of the asset, in this example a virtual (such as CAD-type) representation of the asset, image representations of the asset, or point cloud representations of the asset.

Figure 4:
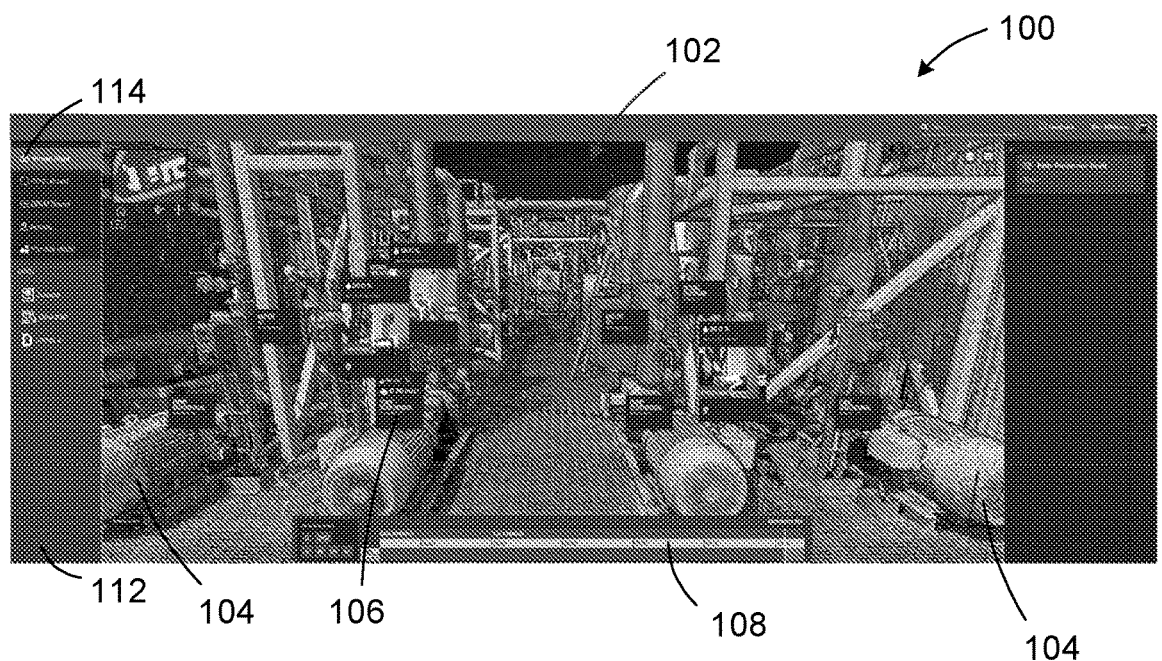
FIGS. 4 and 5 are representations of a digital plant screen displayed to a user by the system shown in FIG. 1, the digital plant screen including a point cloud representation of a portion of an asset.

The asset representation view provides a user with an immersive, realistic representation of the actual asset that the user can navigate through and interact with. An example digital plant screen 100 including an example representation 102 of a portion of the asset, in this example a point cloud representation of the asset, is shown in FIG. 4. The representation 102 includes asset components such as pumps 104, and an information tab 106 for each component that for example includes basic component information such as component type and important sensed information such as temperature and vibration information for a pump component, although it will be understood that any suitable information is envisaged. The representation 102 may also include representations associated with actors that are physically present at the asset. Using the displayed plant screen 100, an operator is able to navigate through the asset representation 102, for example using suitable controls of a computing device 16, 56, 60 disposed in networked communication with the cloud server 22, typically at the control room 14. An operator is also able to view and navigate through the asset representation 102 using the virtual reality equipment 18.

In an example implementation, in order to enhance the situational awareness experience, the asset visualisation application 82 also provides the user with audio derived from the microphones 47 in addition to the visual representation.

In this example, the representation 102 also includes a timeline 108 that may be used to view a corresponding representation of the portion of the asset and/or corresponding component information and/or locations of actors at a defined past time.

Figure 5:
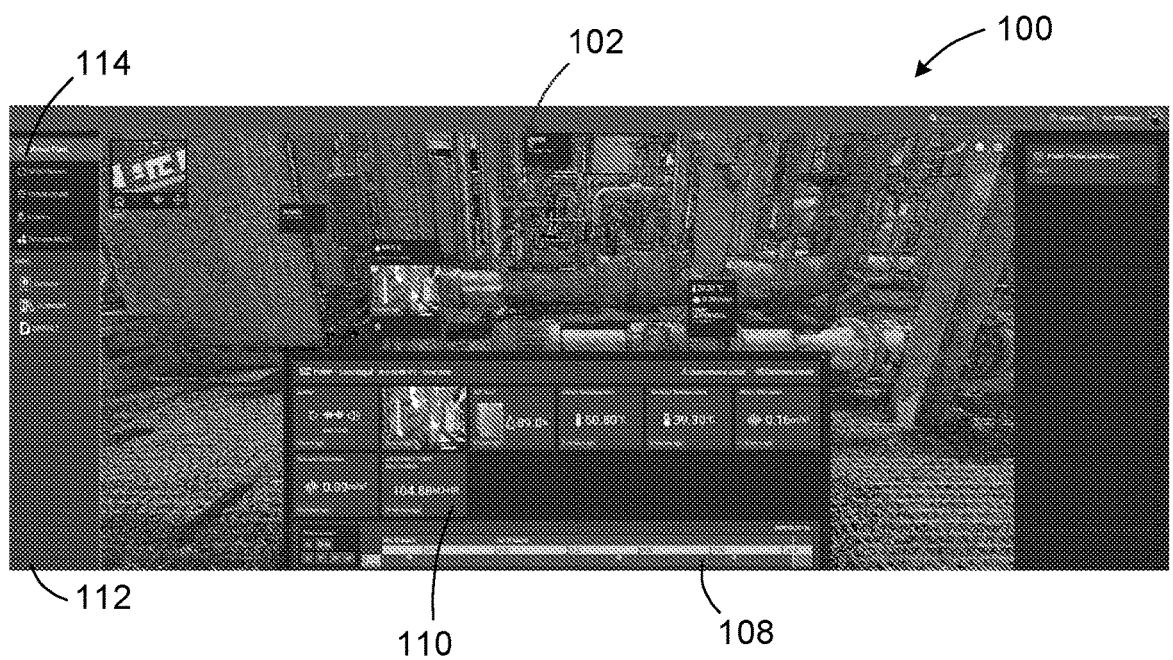

Selection of a component 104, in this example by selecting the relevant component information tab 106, causes a detailed information window 110 to be displayed, as shown in FIG. 5. The detailed information window 110 includes additional component related information, in this example a link to a video of the component, a still image of the component, audio of the component, information indicative of the level of oil in the pump, the temperature of a component coupling, the temperature of a component motor, coupling vibration information, motor vibration information, the ON/OFF status of the component, the component current draw, the fluid flow rate through the pump, and the water pressure, although any suitable component-related information is envisaged. In this example, each piece of information in the detailed information window 110 includes time information indicative of how current the information piece is. For example, in the present application, the audio was received 4 hours ago and the motor vibration information was received 2 minutes ago.

As an alternative, instead of displaying particular information in response to user selection the system may automatically provide detailed information as the user moves through the representation 102. In a variation, the system may be arranged so that desired information can be specified by a user, for example so that the desired information is displayed to the user as the user navigates through the representation 102. Such information provided to the user may also be dependent on other criteria, such as dependent on the particular task that the user is carrying out.

The information tab 106 or detailed information window 110 may also include maintenance information, and/or planned inspections of the relevant component.

It will be appreciated that using the asset virtualisation application 82, an operator is able to navigate through a virtual representation of the asset, to view component related operational data as the operator virtually moves through the asset, and to selectively view detailed information related to a component.

It will be appreciated that a significant amount of information provided in association with a component as the operator views the representation 102 is sourced from 'things' that have been added to the system 10 and configured to provide useful operational information. The combined operational information of a component constitutes a digital twin of the component, and the digital twin information is such that an operator is able to gain situational awareness in relation to the component in the sense that the operator is able to gain a good understanding of the operational status and functionality of the component from a remote location without the need to be physically present at the asset.

The digital plant screen 100 may also enable a user to add custom information or visualisations to the representation 102, such as a visualisation of a flare to show that flaring is present, or custom text boxes.

As shown in FIGS. 4 and 5, in this example the digital plant screen 100 includes a menu bar 112 that includes selectable buttons 114 usable to control functionality of the digital plant screen 100.

Figure 6:
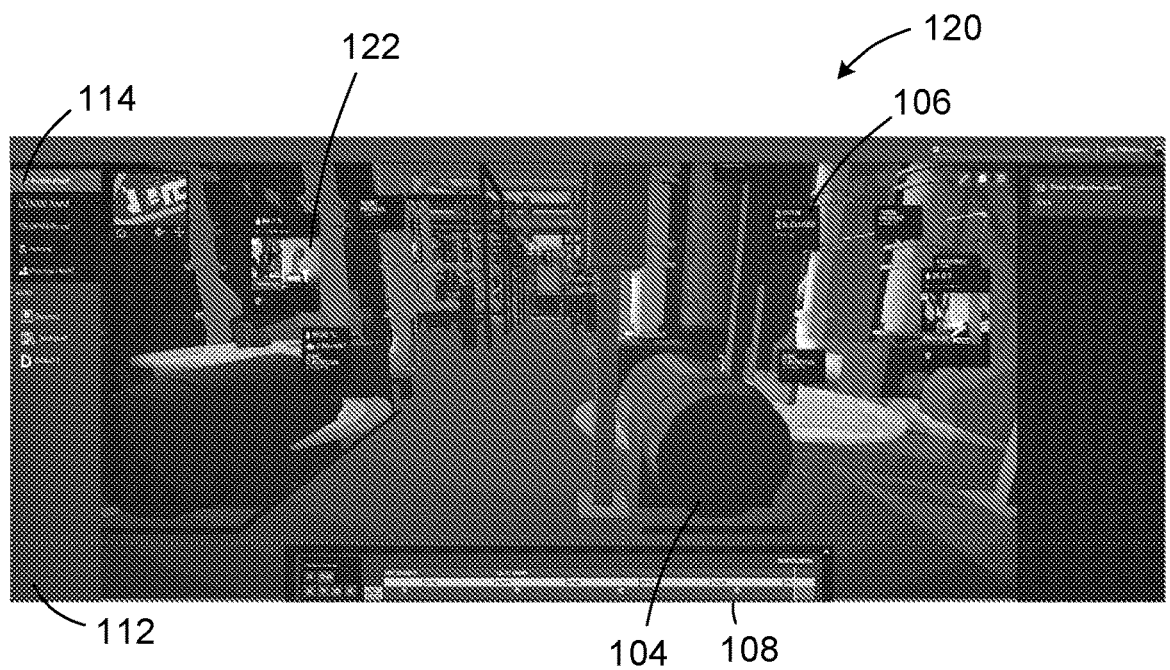
FIG. 6 is a representation of a digital plant screen displayed to a user by the system shown in FIG. 1, the digital plant screen including a virtual representation of a portion of an asset.

A further example of the digital plant screen 100 displaying a virtual (CAD-type) representation 120 of a portion of the asset is shown in FIG. 6. As shown in FIG. 6, the displayed information tabs 106 include an information tab 122 associated with a camera 'thing' and, as such, the camera information tab 106 includes a still or moving image.

In this example, a user is able to view the asset representation in pseudo-3D as shown in FIGS. 4 to 6, or to view the asset representation in virtual reality (VR) or augmented reality (AR) form, for example using the virtual reality equipment 18.

In this example, the system is also arranged to store simulation data and/or to store data usable to generate simulations of operation of the asset, for example including operational data of components of the asset, data indicative of assumptions, and any other data required to generate a simulation. The simulation constitutes a digital operational model of the asset and may correspond to an existing asset configuration, a modified asset configuration or a proposed asset configuration. The simulation may for example be used to predict asset performance, identify process bottlenecks and impacts of input and output materials or resources.

The user applications 34 also include a process awareness application 83 usable to enable an operator to view a representation of a production process or portion of a production process, such as a representation of a flow of product through process and buffer points of the asset. The process representations are linked to the digital twin information so that an operator is able to view relevant operational data associated with components that contribute to the process. The process awareness application 83 in this example uses the stored or created simulations of asset performance.

Figure 7:
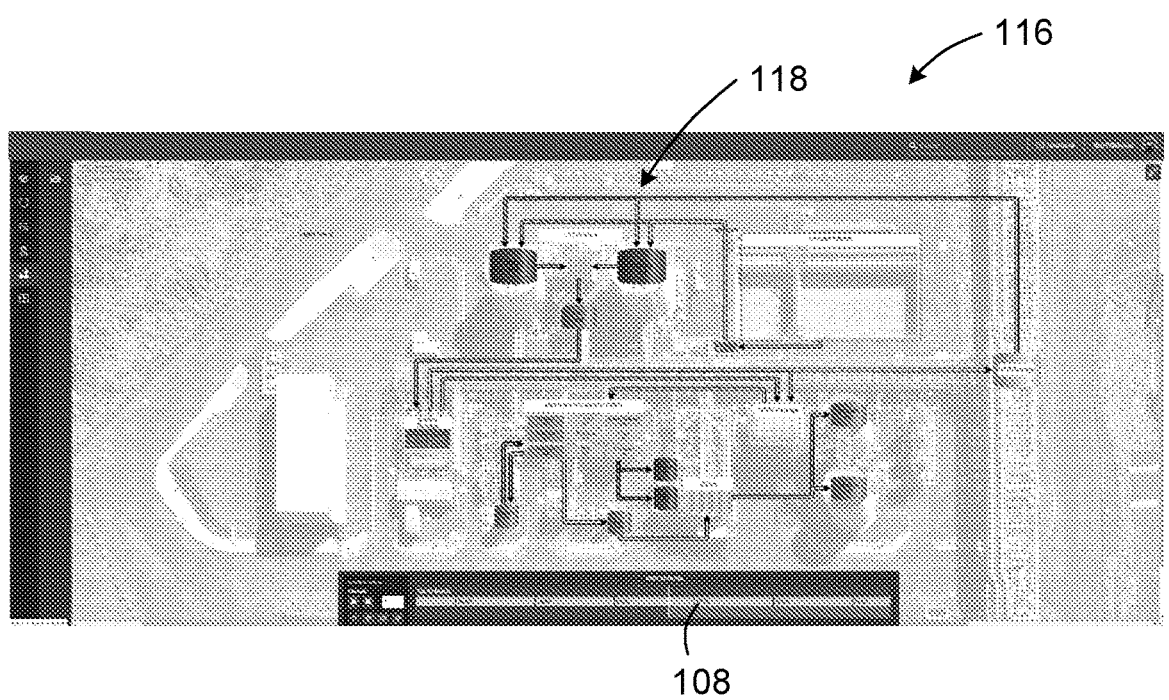
FIG. 7 is a representation of a process awareness screen displayed to a user by the system shown in FIG. 1.

An example process awareness screen 116 including an example process representation 118 of a portion of the asset is shown in FIG. 7.

The process awareness screen 116 is usable to view current or historical production processes, for example by manipulating a timeline (not shown).

The process awareness application 83 may also be used to view a timelapse view of a process wherein representations of the process over a defined time period are played back, for example at a user defined speed. For example, if a problem is identified as part of a diagnostic process, the user is able to select a relevant time period associated with occurrence of the problem and replay relevant process representations and associated data to show what happened. The process awareness application 83 may also provide the user with the option during the diagnostic process to add additional time synchronised data points to the process representation 118. Such a 'data point' may be associated with any data derived from the data generating components 40, 46, 47, 50, 52, 54, such as a sensor or video camera. In an example, the user may add a data point associated with a setting in a control system (such as a valve position) so that the process representation 118 includes data associated with the control system setting for user review. In a further example, a user may add a data point associated with a particular camera to the process representation 118, so that the user may selectively view video derived from the camera by interacting with the process representation 118.

It will be understood that the system may facilitate addition of user selected data points to any visual representation produced by the system.

The process representations 118 may be 2D representations, pseudo-3D representations and/or representations viewable using virtual reality (VR) or augmented reality (AR) techniques, for example using virtual reality equipment 18.

For example, a pseudo-3D representation of a process associated with the asset may be created such that a user can view a selected process architecture and operation using a 3D process model. The process representation may be shared virtually with other users so that multiple users may collaborate to view, design, modify and/or troubleshoot the process.

The user applications 34 also include an analytics application 84 usable by an operator to access the digital twin information in order to extract desired information for review and/or analysis purposes. For example, an operator may use the analytics application 84 to extract specific information about a particular type of component, such as a dataset for pumps produced by a specific manufacturer that have a sensed vibration greater than 5 m/s. In a further example, an operator may use the analytics application 84 to construct a dashboard to track the reliability of equipment that has been regularly inspected compared to equipment that has been inspected less regularly, or may use the analytics application 84 to build a report showing a heat map of changing temperatures across defined components during different wind and external temperature scenarios.

The user applications 34 also include a teamwork application 85 usable by an operator to view information relevant to teams, such as information that provides an overview of production objectives, production plans, production performance, maintenance activities, permits, team assignments, special assignments, real-time health and condition of the asset, and so on.

The user applications 34 also include a sequential observation application 86 that provides an operator with the ability to create and implement a virtualized guided action path through an asset that enables the operator to observe the situational and operational state of the asset and in particular the situational and operational state of defined components of the asset that are included in the virtualized guided path. The sequential observation application 86 is typically used to define a sequence of start of shift observations (SoSO) that sequentially presents to an operator the latest data, events, audio, imagery and video for defined components in a defined path.

Figure 8:
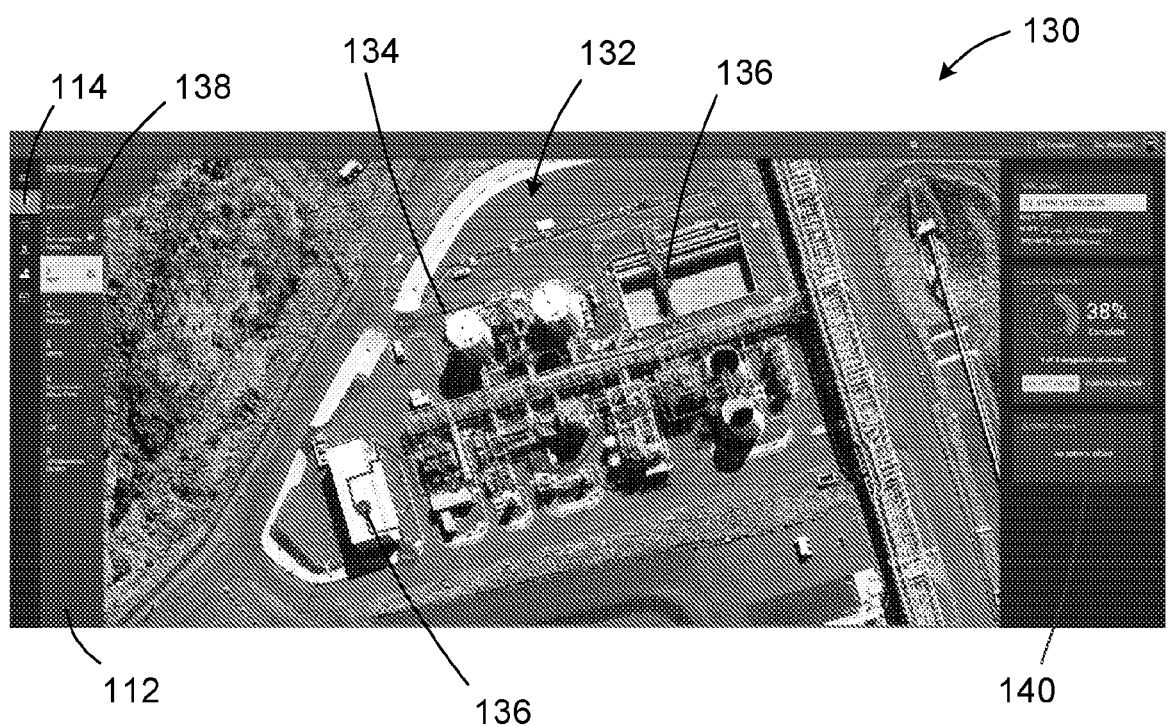
FIG. 8 is a representation of a start of shift observation screen displayed to a user by the system shown in FIG. 1.

An example start of shift observations (SoSO) screen 130 displayed to an operator when the operator uses the sequential observation application 86 to carry out a start of shift sequence is shown in FIG. 8. The SoSO screen 130 includes a virtual representation 132 of a portion of the asset associated with a defined sequence of operations, and a SoSO path 134 that visually indicates the virtual observation path and the locations of defined observations 136. The SoSO screen 130 also includes a path menu 138 and a SoSO details box 140 that includes information about the required actions to carry out (virtually) for each observation location 136.

Figure 9:
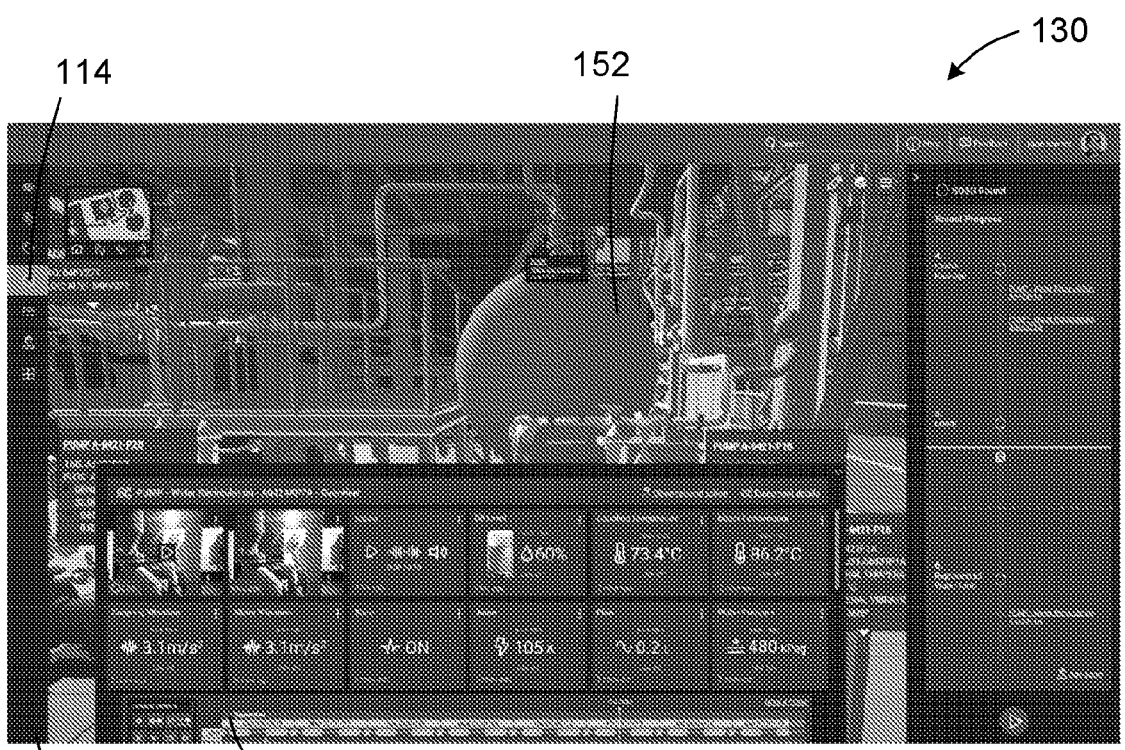
FIG. 9 is a representation of a component included in a start of shift round shown in the start of shift observation screen shown in FIG. 8.

During use, at start of shift, an operator activates a virtualized guided path on the SoSO screen 130 and is automatically guided through the observation locations 136 defined on the path. As shown in FIG. 9, at each observation location 136, a portion 152 of the asset associated with the observation location 136 is displayed on the SoSO screen 130, and at each observation location 136 the operator is able to selectively display a detailed information window 154 that includes information associated with the relevant component derived from the digital twin of the component.

The user applications 34 also include a virtual inspection application 87 usable to enable an operator to carry out scheduled plant observations, such as observations of specific plant components. Using the virtual inspection application 87, an operator is able to virtually inspect a component and for example automatically create a maintenance activity if corrective maintenance is required.

Figure 10:
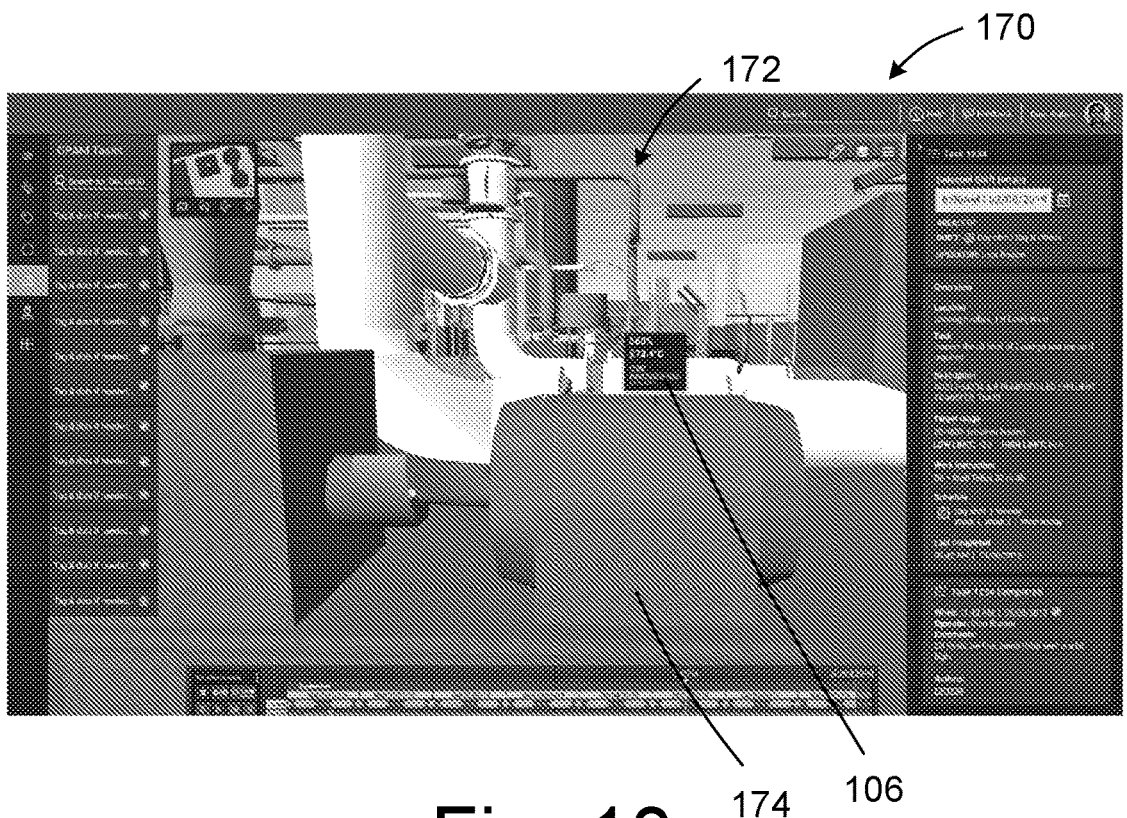
FIGS. 10 and 11 are representations of a virtual inspection screen displayed to a user by the system shown in FIG. 1, the virtual inspection screen including a representation of a component to be inspected.
Figure 11:
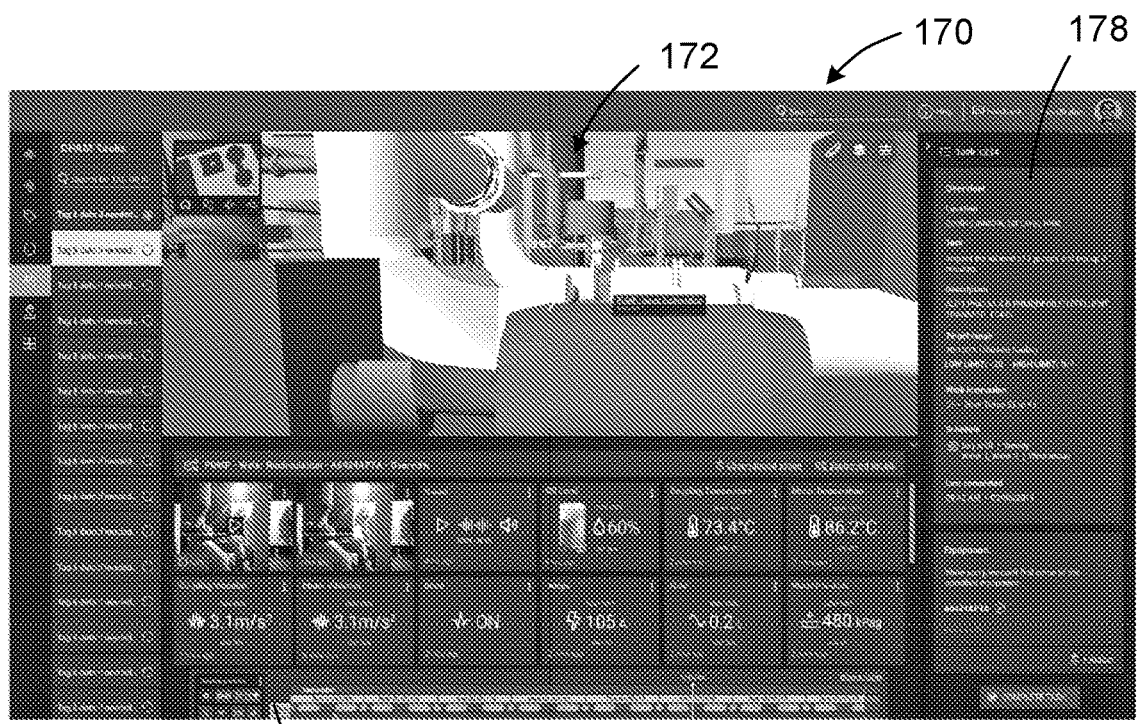

An example scheduled observation screen 170 is shown in FIG. 10. The scheduled observation screen 170 includes a representation 172 of a portion of the asset associated with the scheduled observation, in this example including a representation of a component 174 associated with the scheduled observation. Selection of a component information tab 106 causes a detailed information window 176 to be displayed, as shown in FIG. 11. An overview of the task requirements associated with the scheduled observation is shown in a task overview window 178.

The user applications 34 also include an engineering awareness application 88 that enables an operator to assess and monitor asset design; and assess and monitor planned and actual performance of an asset, in this example by facilitating diagnostic operations and analysis of real-time and historic data.

Using the engineering awareness application 88, an operator is able to create a custom asset representation based on engineering data, process data, event data and situational data, for example derived from the digital twin information, in order to provide a focused analysis of a specific area of interest. The engineering awareness application 88 also facilitates sharing and collaboration with other users of the system 10.

In a specific example, in order to diagnose an identified vibration problem, an operator uses the engineering awareness application 88 to construct a view that enables the operator to visualize relevant data feeds from the asset, for example by adding data points to the visualisation. The operator sets thresholds and alerts on vibration readings to determine the operational scenarios having excess vibration. Using the engineering awareness application 88, the operator is able to replay each scenario, and visualize the production process and data readings to determine the cause. The diagnostic process can also be shared with other operators.

The user applications 34 also include a chat application 89 that provides an operator with the ability to interact with other operators of the system 10. The chat application 89 facilitates direct and group chats that may be linked to any aspect of the asset, such as to a specific location of the asset or a specific asset component. Chats are retainable so that they may serve as useful information for other operators. The chat application 89 also enables other operators, that may be online or offline, to be invited to a chat.

In a specific example, an operator identifies an issue in an area of the asset, and in response the operator uses the chat application 89 to invite a specialist technician operator for that area of the plant to join a chat created for the issue. The invited technician subsequently joins the chat and the operator and technician decide that no action is required. The conversation associated with the chat is retained so that other users of the system can be made aware of the unusual but recognised behaviour.

The user applications 34 also include a voice application 90 that provides an operator with the ability to interact with the system using voice commands and voice responses.

In a specific example, an operator is physically present at the asset and doesn't have a mobile computing device to interact with the system 10. The operator communicates orally with the system 10 using a digital radio in communication with the voice application 90 and requests information about the current operating mode of an area of the plant. In response, the voice application 90 advises that the plant area is in startup. The operator also asks for information about the condition of a particular pump that the operator notices is making an unusual noise. The voice application 90 interprets the verbal instruction and extracts the required information from the digital twin information. If the vibration levels of the pump are exceeding normal operating thresholds, the operator may provide a verbal instruction to initiate a workflow to raise a maintenance notification for the pump.

The user applications 34 also include a virtual review application 91 that provides multiple operators with the ability to virtually review plant design, process and operations. The operators communicate in a shared virtual environment to observe and interact with the virtual representation of the asset.

The virtual review application 92 enables operators to move around the virtual representation, communicate with each other, and annotate parts of the model. Operators can also access design, construction and operational documentation for review purposes in the context of the virtual representation of the asset, or a process flow process representation of the asset. Operators can also execute an operational simulation of the process.

In a specific example, an engineering design team reviews the design of the plant, and works collectively to resolve production bottlenecks in the operational process, for example by reviewing detailed virtual process representations, and operational data.

The user applications 34 also include a knowledge application 92 usable to maintain and facilitate access to a collaborative knowledge base developed through the experience of users of the system 10. The knowledge application 92 may be arranged such that relevant information associated with a particular area or component of the asset is linked to the area or component, so that for example information relevant to a particular component is made visible when an operator is viewing the component.

In a particular example, an operator uses the knowledge application 92 to write a WIKI record and link the record to particular equipment or area in the asset. The operator also associates it with acoustic noise levels to alert other users of the course of action to take when an unusual noise becomes noticeable. Since the course of action in response to such an unusual noise typically results in a maintenance action, a link to automatically create the maintenance notification workflow may be embedded in the text of the WIKI record.

The user applications 34 also include a mission planning application 94 usable to enable an operator to plan, execute, monitor and control autonomous equipment (such as a robot 56) deployed in the real-world asset environment. For example, an operator may schedule a robot to perform periodic automated inspections of the asset to be implemented by the mission engine 78. According to the schedule, the robot 56 is initiated and fully autonomously navigates its planned route. Point cloud, video, images and/or other sensor data may be captured by the robot 56 and processed in real-time to provide inspection results.

The user applications 34 also include a task/notification application 96 that enables an operator to manage assigned tasks, or be notified of events or new or changing activities. An operator can use the task/notification application 96 to initiate new tasks or workflows as required for the operator, their team or other operators or actors. The task/notification application 96 is also usable to monitor task and workflow performance, and automatically trigger notifications to operators when their tasks are exceeding thresholds.

The user applications 34 also include a workforce management application 98 usable to setup and manage swing, shift and operational rosters. The workforce management application 98 enables supervisors to allocate workforce/team members to production activities, and for special activities to be assigned to team members. The workforce management application 98 can provide a visual representation of the team members assigned to different activities across the asset, and is able to use workforce and team member assignments to provide role based tasking and notifications. Workforce competencies and training can also be imported to ensure that the correct qualifications and role requirements are evaluated before shift or special activity assignment occurs.

In order to facilitate collaboration between users, the system 10 may be arranged so that multiple users are able to simultaneously access the system 10, including the asset representation data 24, the component data 28, the reality engine applications 32 and the user applications 34 for collaboration purposes 22. For example, multiple users may access a visual representation of an asset component in a VR or AR environment using virtual reality equipment 18 so that they may experience the same digital environment and collaborate with each other for design, production or diagnostics purposes.

It will be understood that while the above examples are described in relation to a single facility, it will be understood that the present system and method may be applied to multiple facilities, for example such that particular information associated with each facility is available only to users authorised by the facility, but some information is available more broadly, for example so that equipment manufacturers are able to assess the performance of the equipment.

It will also be understood that the present system and method enables data associated with different aspects, functional areas and/or lifecycle stages of an asset to be integrated using the reality engine 30, wherein the data is integrated with context and meaning.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Modifications and variations as would be apparent to a skilled addressee are determined to be within the scope of the present invention.

What is claimed:
1. An asset management system comprising:
 a data storage storing:
  visual data indicative of a visual representation of an asset, the visual representation including visual representations of components of the asset;
  component data indicative of characteristics of components of the asset including component operational data indicative of operation of the components, the component operational data being time stamped so as to include timing data indicative of a time at which operational data is obtained from a component; and
  spatial data including component location data indicative of geospatial location of the components physically disposed within the asset, the component location data including timing data indicative of a time at which a component is disposed at a location, the spatial data being stored in a first coordinate format according to a defined coordinate system;
 a plurality of communication-enabled things disposed at the asset, each communication-enabled thing disposed at the asset to obtain component operational data indicative of operation of at least one component of the asset, and communicating the component operational data to the data storage; and
 a user interface accessing the stored visual data, the user interface controllable by a user to display a visual representation of a selected portion of an asset, the visual representation of the selected portion including visual representations of components spatially located within the asset, and the user interface enabling the user to virtually navigate spatially through the asset by displaying visual representations of adjacent portions of the asset in response to receipt of navigation instructions from the user;

wherein;

the user interface accesses the stored component operational data and displays the component operational data adjacent a corresponding component of the asset as the user virtually navigates spatially through the visual representations of portions of the asset, the component operational data derived from at least one communication-enabled thing associated with the component;

the user interface comprises a user manipulatable timeline associated with the displayed selected portion of the asset, the timeline usable by a user to select a time; and in response to the user selecting the time, the user interface uses the time stamps associated with the component operational data and the timing data associated with the component location data to cause a display of component operational data associated with the selected time for all components spatially located on the displayed selected portion of the asset at the selected time.

2. An asset management system as claimed in claim 1, wherein the user interface automatically displays component information adjacent a component as the user navigates through the visual representation of the asset when the visual representation of the component is displayed by the user interface.

3. An asset management system as claimed in claim 2, wherein at least some of the component information displayed adjacent a component is based on user defined criteria.

4. An asset management system as claimed in claim 1, wherein:

the spatial data includes actor location data indicative of location of an actor at the asset, the actor location data including timing data indicative of a time at which an actor is disposed at a location; and the visual representation of the asset includes a visual representation of the actor at a location corresponding to the location of the actor at the asset.

5. An asset management system as claimed in claim 4, comprising a plurality of machine-readable markers disposed at distributed locations at the asset, wherein the actor includes a location device that determines the location of the location device relative to the machine-readable markers and thereby the location of the actor relative to the asset.

6. An asset as claimed in claim 4, wherein a location device of the actor determines the location of the actor relative to the asset using simultaneous localisation and mapping (SLAM) techniques.

7. An asset management system as claimed in claim 1, wherein the user interface uses a second coordinate format different to the first coordinate format, and the system converts location data between the first and second coordinate formats.

8. An asset management system as claimed in claim 1, further comprising an edge server disposed between a wide area network and the communication-enabled things, the edge server processing data obtained from the communication-enabled things and communicating processed data to the data storage through the wide area network.

9. An asset management system as claimed in claim 1, comprising an analysis engine that automatically analyses the component data and carries out an action in response to the analysis.

10. An asset management system as claimed in claim 1, wherein the system carries out an action in response to location of an actor at the asset.

11. An asset management system as claimed in claim 4, wherein:

the actor includes a robot; and the system causes the robot to carry out a defined action in response to defined criteria.

12. A method of managing an asset, the method comprising:

storing visual data indicative of a visual representation of an asset at a data storage, the visual representation including visual representations of components of the asset;

storing component data indicative of characteristics of components of the asset including component operational data indicative of operation of the components at the data storage, the component operational data being time stamped so as to include timing data indicative of a time at which operational data is obtained from a component;

storing spatial data including component location data indicative of geospatial location of the components physically disposed within the asset, the component location data including timing data indicative of a time at which a component is disposed at a location, the spatial data being stored in a first coordinate format according to a defined coordinate system;

disposing a plurality of communication-enabled things at the asset, each communication-enabled thing disposed to obtain component operational data indicative of operation of at least one component of the asset, and communicating with the data storage to transfer the component operational data to the data storage;

facilitating access to the stored visual data using a user interface, the user interface controllable by a user to display a visual representation of a selected portion of the asset, the visual representation of the selected portion including visual representations of components spatially located within the asset, and the user interface enabling the user to virtually navigate spatially through the asset by displaying visual representations of adjacent portions of the asset in response to receipt of navigation instructions from the user;

facilitating access by the user interface to the stored component operational data; and facilitating display on the user interface of the component operational data adjacent a corresponding component of the asset as the user virtually navigates spatially through the visual representations of portions of the asset, the component operational data derived from at least one communication-enabled thing associated with the component;

wherein:

the user interface comprises a user manipulatable timeline associated with the displayed selected portion of the asset, the timeline usable by a user to select a time; and in response to the user selecting the time, the user interface uses the time stamps associated with the component operational data to facilitate and the timing data associated with the component location data to cause a display of component operational data associated with the selected time for all components spatially located on the displayed selected portion of the asset at the selected time.

13. A method as claimed in claim 12, comprising automatically displaying component information adjacent a component as the user navigates through the visual representation of the asset when the visual representation of the component is displayed by the user interface.

14. A method as claimed in claim 13, wherein at least some of the component information displayed adjacent a component is based on user defined criteria.

15. A method as claimed in claim 12, wherein:
the spatial data includes actor location data indicative of location of an actor at the asset, the actor location data including timing data indicative of a time at which an actor is disposed at a location; and
the visual representation of the asset includes a visual representation of the actor at a location corresponding to the location of the actor at the asset.

16. A method as claimed in claim 15, wherein the actor includes a location device and the method comprises providing a plurality of machine-readable markers disposed at distributed locations at the asset, and determining the location of the location device relative to the machine-readable markers and thereby the location of the actor relative to the asset.

17. An asset as claimed in claim 15, comprising determining the location of the actor relative to the asset using simultaneous localisation and mapping (SLAM) techniques.

18. A method as claimed in claim 12, wherein the user interface uses a second coordinate format different to the first coordinate format, and the method comprises converting location data between the first and second coordinate formats.

19. A method as claimed in claim 12, comprising processing data obtained from the communication-enabled things using an edge server disposed between a wide area network and the communication-enabled things, and communicating processed data to the data storage through the wide area network.

20. A method as claimed in claim 12, comprising automatically analysing the component data using an analysis engine and carrying out an action in response to the analysis.

21. A method as claimed in claim 12, comprising carrying out an action in response to location of an actor at the asset.

22. A method as claimed in claim 15, wherein:
the actor includes a robot; and
the method further comprises causing the robot to carry out a defined action in response to defined criteria.

\* \* \* \* \*